Sept. 22, 1925.

F. T. KITCHEN

ELECTRIC ATOMIZER HEATER

Filed April 25, 1923

1,554,219

INVENTOR
Frederick T. Kitchen

By Attorneys,
Fraser Turks Myers

Patented Sept. 22, 1925.

1,554,219

UNITED STATES PATENT OFFICE.

FREDERICK T. KITCHEN, OF NEW BRUNSWICK, NEW JERSEY, ASSIGNOR TO AUSTIN & KITCHEN, OF NEW YORK, N. Y., A FIRM COMPRISING AS COPARTNERS ERNEST AUSTIN AND FREDERICK T. KITCHEN.

ELECTRIC ATOMIZER HEATER.

Application filed April 25, 1923. Serial No. 634,495.

*To all whom it may concern:*

Be it known that I, FREDERICK T. KITCHEN, a citizen of the United States, residing in New Brunswick, in the county of Middlesex and State of New Jersey, have invented certain new and useful Improvements in Electric Atomizer Heaters, of which the following is a specification.

This invention relates to atomizers and aims to provide certain improvements therein.

The invention provides a device by means of which a hot or warm spray is produced and in which the liquid or air, or liquid and air, is heated after it leaves its container, and preferably in the immediate vicinity of the nozzle where the liquid is entrained by the air jet. The invention further provides a device of the character described which is of simple construction, self-contained, portable, easily taken apart, and in which parts may be readily replaced by others.

Two embodiments of the invention are illustrated in the accompanying drawing, in which—

Figure 1:
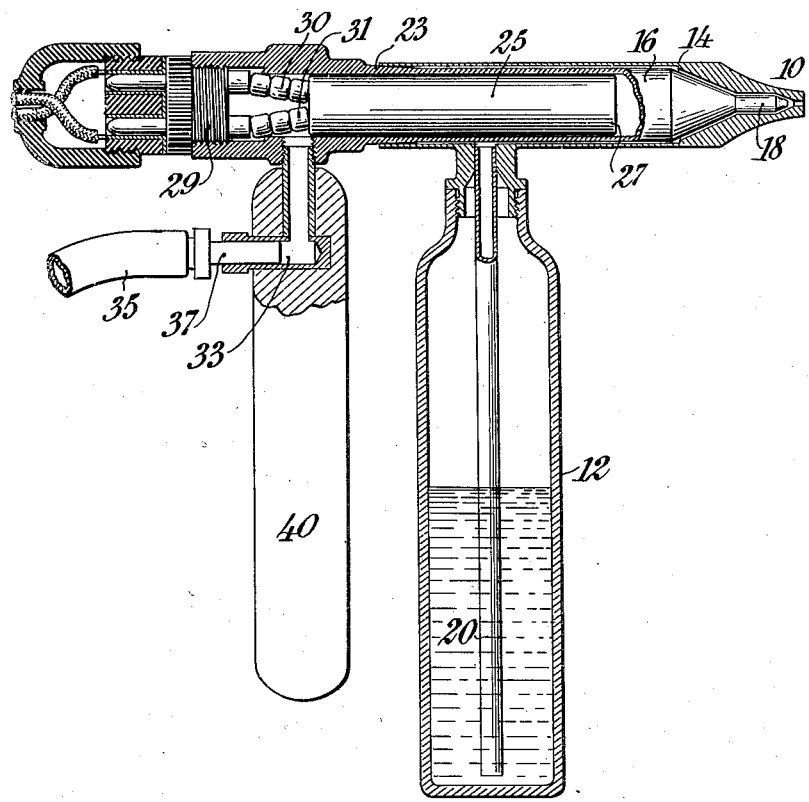
Figure 1 is a sectional view of one embodiment of the improved atomizer.

Referring to said drawings, numeral 10 designates the nozzle of the device through which air and liquid are adapted to issue, the liquid being entrained by the jet of air and atomized or divided according to the usual mode of operation of an atomizing device.

Liquid from any suitable or desired source, as a bottle 12, is drawn to the nozzle 10 through a tubular or hollow part 14 communicating with said nozzle and air from any suitable or desired source, as from a hose connected to a compressed air reservoir (not shown) may be supplied to said nozzle 10 through a tube 16 having an outlet or nozzle 18 suitably arranged with reference to the nozzle 10 to entrain the liquid drawn to said nozzle. According to the embodiment illustrated in Fig. 1 the tube 16 is arranged inside and concentric of the tube 14, and the air nozzle 18 is just behind and in line with the nozzle 10. While air has been described as supplied to the tube 14 and liquid to the tube 16, this arrangement is not essential, as an inverse arrangement is suitable. A siphon tube 20 attached to and communicating with the liquid tube 14, and adapted to project into the bottle 12, may be provided. The tube 16 may fit fairly closely inside of the tube 14, as the surface irregularities will provide sufficient area for the flow of liquid to the small orifice in the nozzle 10. The tube 14 is preferably detachably connected to the tube 12, and to this end the tubes 12 and 14 may have a taper fit, as indicated at 23.

Suitable means 25 are provided for heating the liquid, or air, and preferably both, after the liquid, or air, or liquid and air, leaves its container and preferably in the immediate vicinity of the nozzle 10. According to the embodiment illustrated in Fig. 1, the heating means 25 is in the form of an electrical heating unit or cartridge 27 of any suitable or desired construction adapted to fit inside of the air tube 16, and is preferably detachably secured to the device, as by means of a screw-plug 29 engaging threads on the end of said tube 16. The plug 29 shown is of the usual switch coupling type and the heating element in the cartridge 27 is connected to the coupling plug 29 by means of insulated conductors 30, 31.

Air may be admitted to the tube 16 through a conduit 33 in communication therewith, the conduit 33 being connected to any suitable source of supply, as to an air tank through a hose connection 35, said hose being joined to said conduit in suitable manner, as by means of a taper-plug 37.

The fit between the cartridge 27 and the inside of tube 16 may be fairly close, as the surface irregularities of the parts will be enough to admit of sufficient air being delivered to the nozzle 18.

By removing the tubular part 14 and cartridge 27, the several parts of the device are thereby detached, and substantially all parts exposed for convenient inspection, cleaning and repair.

A handle 40 may be provided for convenient manipulation of the device.

Figure 2:
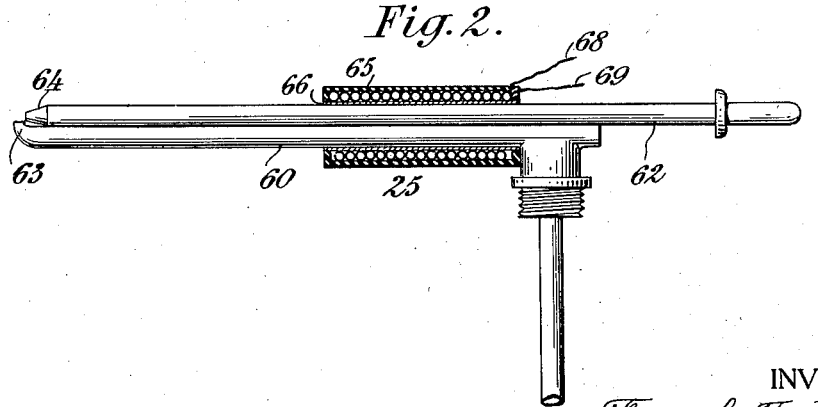
Fig. 2 is a similar view of another embodiment.

A second embodiment of the invention is illustrated in Fig. 2. 60 designates a liquid tube and 62 an air tube. The nozzles 63, 64 of the tubes are brought together in such manner that the jet of air from the nozzle 64 entrains liquid from the nozzle 63 and thereby produces the atomization of the liquid.

The heating means 25 is here illustrated as in the form of a sleeve 65 having a central opening 66 through which the tubes 60, 62 are adapted to pass, and which sleeve contains an electrical heating element of any suitable character to which electricity is conducted through wires 68, 69. The sleeve 65 is, preferably made detachable from the tubes 60, 62.

Operation: Electricity being admitted to the heating element 25, the said heating element becomes hot. In Fig. 1 this heating element being in the form of a cartridge 27 inside of the air tube 16, heats the air flowing over it to the nozzle 10, and the heat radiated from the air in the tube 16 is imparted to the liquid in the tube 14 surrounding the said tube 16. Both the liquid in tube 14 and the air in tube 16 are thereby heated, and the heating element 25 being in the vicinity of the nozzle 10, only very little heat will be lost by either the air or liquid by radiation between the heating element and the nozzle. The spray which issues from the nozzle 10 will therefore be in fact a heated spray despite the cooling due to expansion of the air after leaving the nozzle 10. In Fig. 2 the heating element 25 being in the form of a sleeve 65, heats by inward radiation both the liquid tube 60 and the air tube 62, and the liquid and air remain heated while passing to the nozzles 63, 64, and a spray which is in fact heated is readily obtained.

The invention may receive other embodiments than those herein specifically illustrated and described.

What is claimed is:

1. An atomizing device having a nozzle, means for supplying liquid and air to said nozzle, and means for heating fluid supplied to said nozzle between its source of supply and said nozzle.

2. An atomizing device having a nozzle, means for supplying liquid and air to said nozzle, and electrical means for heating fluid supplied to said nozzle between its source of supply and said nozzle.

3. An atomizing device having a nozzle, liquid and air tubes leading thereto, and heating means adjacent said nozzle for heating said tubes.

4. An atomizing device comprising a nozzle, a tube for conducting fluid to said nozzle, and a heating element located in said tube.

5. An atomizing device comprising a nozzle, concentric tubes leading to said nozzle, and a heating element located in the inner concentric tube.

6. An atomizing device comprising a nozzle, concentric tubes leading to said nozzle, and a heating element located in the inner concentric tube, said heating element being in the form of a cartridge substantially conforming to the inner contour of the tube in which it fits.

In witness whereof, I have hereunto signed my name.

FREDERICK T. KITCHEN.